United States Patent
Denise et al.

(10) Patent No.: US 10,635,483 B2
(45) Date of Patent: Apr. 28, 2020

(54) AUTOMATIC SYNOPSIS GENERATION FOR COMMAND-LINE INTERFACES

(71) Applicant: Red Hat, Inc., Raleigh, NC (US)

(72) Inventors: Jean Francois Denise, Paris la Defense (FR); Oleksiy Lubyanskyy, Neuchatel (FR); Ståle Waage Pedersen, Oslo (FR)

(73) Assignee: Red Hat, Inc., Raleigh, NC (US)

( * ) Notice: Subject to any disclaimer, the term of this patent is extended or adjusted under 35 U.S.C. 154(b) by 132 days.

(21) Appl. No.: 15/720,361

(22) Filed: Sep. 29, 2017

(65) Prior Publication Data

US 2019/0102218 A1    Apr. 4, 2019

(51) Int. Cl.
| | |
|---|---|
| G06F 9/48 | (2006.01) |
| G06F 9/455 | (2018.01) |
| G06F 9/445 | (2018.01) |
| G06F 3/0489 | (2013.01) |
| G06F 9/451 | (2018.01) |

(52) U.S. Cl.
CPC .......... *G06F 9/4843* (2013.01); *G06F 3/0489* (2013.01); *G06F 9/44557* (2013.01); *G06F 9/451* (2018.02); *G06F 9/453* (2018.02); *G06F 9/45512* (2013.01)

(58) Field of Classification Search
CPC ................ G06F 9/4843; G06F 9/451
USPC ................. 718/1–108; 717/120–123
See application file for complete search history.

(56) References Cited

U.S. PATENT DOCUMENTS

| | | | | |
|---|---|---|---|---|
| 5,301,270 A | * | 4/1994 | Steinberg ................ | G06F 8/20 715/866 |
| 6,141,660 A | * | 10/2000 | Bach ..................... | G06F 16/289 |
| 6,212,530 B1 | * | 4/2001 | Kadlec ................. | G06F 16/288 |
| 7,155,664 B1 | | 12/2006 | Lee et al. | |
| 7,197,739 B2 | * | 3/2007 | Preston ................. | G06F 8/30 717/106 |
| 7,434,159 B1 | | 10/2008 | Lin | |
| 7,502,999 B1 | * | 3/2009 | Saiyed .................. | G06F 8/73 715/205 |
| 8,375,358 B2 | * | 2/2013 | Baldwin ................ | G06F 8/38 717/114 |

(Continued)

OTHER PUBLICATIONS

Maletic, Jonathan I., Michael L. Collard, and Andrian Marcus. "Source code files as structured documents." Proceedings 10th International Workshop on Program Comprehension. IEEE, 2002. pp. 1-4 (Year: 2002).*

(Continued)

*Primary Examiner* — Satish Rampuria
(74) *Attorney, Agent, or Firm* — Lowenstein Sandler LLP

(57) ABSTRACT

Aspects of the disclosure provide for mechanisms for automatic generating synopsis data of command-line commands. A method of the disclosure includes processing source code implementing a command; identifying, in view of the processing, a plurality of command options related to the command; generating, by a processing device, relationship data representing dependencies of the command options; and generating, by the processing device, synopsis data for the command in view of the relationship data. In some embodiments, the relationship data may include a graph, wherein the graph including an arc that associates a first node of the graph with a second node of the graph. The first node may correspond to the first command option. The second node may correspond to the second command option.

18 Claims, 8 Drawing Sheets

(56) References Cited

U.S. PATENT DOCUMENTS 8,621,438 B2 * 12/2013 Stone .................. G06F 11/3636
717/127
9,047,168 B2    6/2015  Shivananda et al.
2010/0050069 A1  2/2010  Arning et al.

OTHER PUBLICATIONS

Kim, Jinhan, et al. "Adding examples into java documents." 2009 IEEE/ACM International Conference on Automated Software Engineering. IEEE, 2009.pp. 540-544 (Year: 2009).*
Cardinaels, Kris, Michael Meire, and Erik Duval. "Automating metadata generation: the simple indexing interface." Proceedings of the 14th international conference on World Wide Web. ACM, 2005.pp. 548-556 (Year: 2005).*
Schwartz, R. A., et al. "RHESSI data analysis software: rationale and nnethods." Solar Physics 210.1-2 (2002): pp. 165-191. (Year: 2002).*
Bahn, Sune R., and Karsten W. Jacobsen. "An object-oriented scripting interface to a legacy electronic structure code." Computing in Science & Engineering 4.3 (2002): pp. 56-66. (Year: 2002).*
Liu, Weiyuan. "Natural user interface-next mainstream product user interface." 2010 IEEE 11th International Conference on Computer-Aided Industrial Design & Conceptual Design 1. vol. 1. IEEE, 2010.pp. 203-205 (Year: 2010).*
"Javadoc—The Java API Documentation Generator", Oracle Technology Network, accessed Aug. 2, 2017, 45 pages http://docs.oracle.com/javase/7/docs/technotes/tools/windows/javadoc.html.
"Texture Packer Online Documentation", accessed Aug. 2, 2017, 30 pages https://www.codeandweb.com/texturepacker/documentation.

* cited by examiner

AUTOMATIC SYNOPSIS GENERATION FOR COMMAND-LINE INTERFACES

TECHNICAL FIELD

The implementations of the disclosure relate generally to computer systems and, more specifically, to automatic generation of synopsis data for command-line interface commands.

BACKGROUND

A command line interface (CLI) is a user interface to a computer program that enables a user to interact with the computer program by issuing commands. For example, a user may issue a command to be performed by an operating system using a CLI to the operating system (e.g., by entering a string of characters corresponding to the command). Upon receiving the command, the operating system can execute a program and/or perform operating system functions that correspond to the command.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
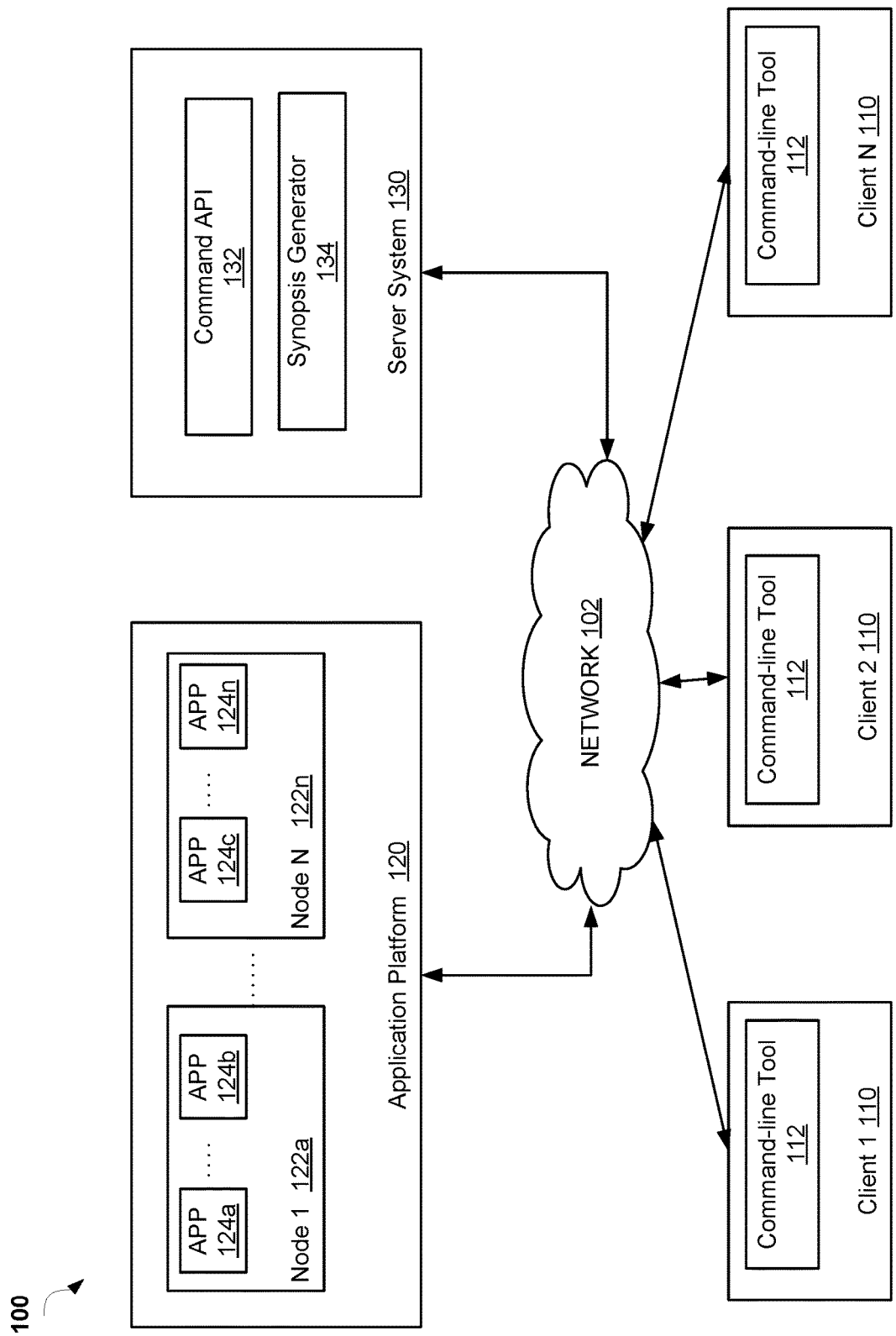
FIG. 1 is a block diagram of a network architecture in which implementations of the disclosure may operate.

Aspects of the disclosure provide for mechanisms for automatic generation of synopsis data for command-line interfaces. A command-line interface (CLI) may be used to interact with or control a software application. A CLI may use a command to produce a request to perform an identified function to be executed on a specified resource with the specified values of one or more parameters.

As referred to herein, a command-line interface command or a command may be a program executed using a command-line interpreter (e.g., a shell). In some embodiments, a command may specify one or more operations to be performed by a computer system. For example, a user may issue a command using a CLI to cause one or more actions to be applied to a remote server (e.g., an application server). The actions may include, for example, starting and stopping the server, deploying and undeploying applications on the server, monitoring statuses of virtual machines running on the server, configuring system settings, etc.

A command can be configured with one or more command options and arguments. A command option (also referred to herein as the "option") may be a parameter that modifies one or more aspects of the execution of a command. For example, specifying a certain option of a command to be executed may modify the command's behavior.

A command argument may specify an item of information that can be used for executions of a command. For example, an argument may identify a source of data to be used to execute the command, a destination of data to be used to execute a command. In some embodiments, a command option and/or a command argument may be specified by a key-value(s) pair.

Users of a CLI may need to refer to information about usage of commands (e.g., command options and arguments related to a command, etc.). Prior solutions for CLI provide some documentation, such as a user's manual pages, to help the users to arrange command options and build valid commands. A manual page (referred to herein as "man page") may include a description of a command, a syntax of the command, and usage of one or more options associated with the command. The man page is a static document provided by a software developer that develops the command. The software developer may need to manually create the man page in addition to implementations of the command. To create new options, modify existing options, update the command, or create new commands, the software developer may have to manually create updated man pages to include updated usage of the commands and/or options. Such updated usage may involve numerous commands and operations performed by computer systems. The command options related to the updated usage may have complicated relationships. Accordingly, each time a new option is added, great care must be taken at the implementation level to properly capture its relationships with existing options. As such, the prior solutions for providing synopses for CLIs are error-prone and time-consuming. Moreover, the prior solutions may generate man pages that are unsynchronized with the implementations of new command and/or options.

Aspects of the disclosure address the above deficiencies by providing mechanisms (e.g., systems, methods, machine-readable media, etc.) for automatic generation of synopsis data for commands. The mechanisms provide a synopsis generator that can process source code including an implementation of a command and automatically generate a synopsis of the command. For example, the synopsis generator can analyze software code including an implementation of the command by performing introspection and/or reflection on the source code. The synopsis generator can analyze one or more annotated objects, classes, and/or fields (e.g., JAVA™ objects, classes, fields, etc.) in the software code that implements the command. As used herein, "introspection" may refer to a process of inspecting and/or examining source code (e.g., JAVA™ application code) to determine properties of software objects in the source code (e.g., JAVA™ objects). As used herein, "reflection" may refer to a process of inspecting, examining, and/or modifying run-time behavior of an application running in a virtual machine, such as one or more classes, interfaces, and/or software objects (e.g., JAVA™ objects) in the virtual machine (e.g., a JAVA™ virtual machine). In some embodiments, introspection and/or reflection can be performed through an API that provided introspection and/or reflection functionality. The API can provide, for example, functions for determining a class of an object; getting information about a class's modifiers, fields, methods, constructors, and superclasses; finding out what constants and method declarations belong to an interface; creating an instance of a class whose name is not known until runtime; getting and setting the value of an object's field (e.g., a field having a field name that is unknown until runtime); and/or invoking a method on an object, even if the method is not known until runtime.

The synopsis generator can then determine information about the command options associated with the command. For example, the synopsis generator can perform reflection on the source code to identify one or more annotations related to one or more command options and/or attributes of the command options. Each of the annotations may include syntactic metadata related to the command and/or the command options. For example, each of the annotations may include an at-sign ("@") followed by an annotation type and an option list of value pairs. In some embodiments, reflection can be performed on classes defining the command and annotations associated with the classes. In some embodiments, the synopsis generator can identify one or more of the annotations indicating an option type. The synopsis generator can then determine that each of the annotations corresponds to a command option related to the command. The option type may include, for example, a first option type that defines an option having one value, a second option type that defines an option having multiple values, a third option type that defines an option requiring one or more arguments, etc.

The synopsis generator can also perform reflection on the contents of the annotations corresponding to the command options to determine one or more attributes of the command options. Examples of an attribute of a command option may include a name of the command option, a description of the command option, whether the command is required or optional for the execution of the command, an "activator" attribute, etc. The "activator" attribute may relate to a logic that may trigger the visibility of the command option. For example, the "activator" attribute may provide that the command option depends on a value of another command option to be set or a specific value before the command option can be used. As another example, the "activator" attribute may provide that the command option can be used when one or more other command options are not present. As still another example, the "activator" attribute may provide that the command option refers to a standalone server or a managed domain.

The synopsis generator can determine dependencies of the command options in view of the attributes of the command options. More particularly, for example, the synopsis generator can determine, for an identified command options, one or more other command options that depend on the command option (e.g., in view of an "activator" attribute of the command option), one or more other options on which the command option depends on (e.g., in view of "activator" attributes of the other command options), one or more other options that conflict with the command option. A first command option may be regarded as depending on a second command option when the second command option needs to be set for the first command option to be valid. For example, the first command option may be an option that creates a non-existing directory. The second command option may be an option that references to a file system path. As such, the first command option may be valid when the second command option is present in the command. A third command option may be regarded as conflicting with a fourth command option when the third command option may not be set if the fourth command option is already set. For example, the third command option may be a command option that identifies a given entity. The fourth command option may be a command option that identifies all entities. As such, once one of the third command option or the fourth command option is set, the other option may not be set or may become meaningless.

In some embodiments, the synopsis generator can generate dependency data representing the dependencies of the command options. The dependency data may include, for example, a graph comprising a plurality of nodes and arcs. Each of the nodes may correspond to a command option related to the command. Each of the arcs may represent a relationship between two or more command options. For example, the graph may include a first arc that associates a first node of the graph with a second node of the graph. The first node may correspond to a first command option. The second node may correspond to a second command option that depends on the first command option. The first arc thus represents the dependency relationship between the first command option and the second command option. As another example, the graph may include a second arc associating the first node with a third node of the graph. The third node may correspond to a third command option that conflicts with the first command option. As such, the second arc represents the conflict between the first command option and the third command option.

In some embodiments, the synopsis generator can also determine one or more constraints for each of the command options in view of the implementation of the command. For example, the synopsis generator can determine an execution context for a command option. The execution context may include attributes and other information related to execution of the command. For example, the execution context of the command option may include that the command option is attached to a fault-tolerant server. As another example, the synopsis generator can determine whether a connection to a specific server is required for the execution of a command option.

The synopsis generator can generate synopsis data for the command in view of the dependency data and/or the constraints. The synopsis data can specify a syntax of the command, one or more command options associated with the command (e.g., options that make the command valid), syntaxes of the options, one or more constraints related to the command options, etc. In some embodiments, the synopsis data can be displayed in a CLI to inform a user of usage of the command. The synopsis data can also be provided to a software developer that develops the command to assist in development and testing of the command. Accordingly, the mechanisms described herein can automatically generate synopsis data that may present complex relationships between command options and reflect command runtime behaviors. The mechanisms can also provide automatic testing functions for CLI command development.

FIG. 1 is a block diagram of an example of a computer system 100 in which implementations of the disclosure may operate. System architecture 100 may include one or more client computers 110, an application platform 120, and a server system 130. Each of the client computers 110 may be communicatively coupled to application platform 120, and/or server system 130 via the network 102. Although three client computers are illustrated in FIG. 1, any number of client computers may be present in system architecture 100.

Each of client computers 110, application platform 120, and server system 130 may include a computing device such as a server computer, a desktop computer, or a laptop computer, or a portable computing device such as, but not limited to, mobile telephones, personal digital assistants (PDAs), portable media players, netbooks, tablet computers, portable gaming consoles, portable televisions, electronic book readers, and the like. In some embodiments, each of client computers 110, application platform 120, and server system 130 may include a computer device as described in connection with FIG. 8 below.

The network 102 may be a private network (e.g., a local area network (LAN), a wide area network (WAN), intranet, etc.), a public network, a wireless network, a cellular network, or a combination thereof.

Application platform 120 may include one or more server computers. Each of the server computers may include a computing device as described in connection with FIG. 8 below. Application platform 120 may provide an online infrastructure, such as a cloud computing platform that may allow multiple users from multiple client systems (e.g., client computers 110) to access different components or computer resources of the cloud computing platform. The online infrastructure may provide physical or virtual resources, such as access to services, servers, or other such resources, to client systems. Examples of services (or functionality) provided by the online infrastructure may include, but are not limited to, access to data stored on storage devices, provisioning of virtual machines, software services, physical servers, etc.

Application platform 120 can provide one or more application programming interfaces (APIs), services, and runtime environment for running and developing applications. In some embodiments, application platform 120 can be a JAVA™ EE (JAVA™ Platform, Enterprise Edition), such as a Red Hat™ JBoss Enterprise Application Platform.

Application platform 120 may include one or more nodes (e.g., nodes 121*a*, . . . , 121*n*) on which applications 124*a*, 124*b*, 124*c*, 124*n* may be provisioned and executed. In one implementation, each node may be a virtual machine (VM). In some embodiments, the VMs may be provisioned by an infrastructure as a Service (IaaS) provider. In other implementations, the nodes 121*a-n* may be physical machines or VMs residing on a physical machine. An application (e.g., software application) may be one or more related processes to be executed by one or more servers in order to deliver certain functionality. Applications 124*a-n* may be any software application. In some embodiments, one or more of applications 124*a-n* may be distributed across multiple nodes.

Client computer 110 can include one or more command line tools 112 that can enable a user to create, launch, and manage applications. In one implementation, command line tool 112 can be downloaded and installed on the client computer, and can be accessed via a command line interface, a graphical user interface, or any other type of interface. A user may issue commands to the command line tool 112 by inputting text in the command line interface (e.g., in the form of command lines). The command-line interface may be used in, for example, a user-software interaction (e.g., interface), by script files in batch processing, or by another software application to communicate with one or more applications 124*a-n*. In one implementation, the command line tool 112 may expose one or more APIs of application platform 120 and/or server system 130.

In some embodiments, command line tools 122 can provide a command-line interface for managing one or more servers and applications on application platform 120. For example, a user can issue commands in the command-line interface (e.g., by entering text input in the command-line interface) to start and stop servers, deploy and undeploy applications, configure system settings, and/or perform any other administrative task. In some embodiments, once the command-line tool 122 is launched on a client system, the client system can connect to a running server instance or managed domains to perform management operations.

In some embodiments, the command-line tool 112 can provide information related to one or more commands via the command-line interface. For example, the user can issue a command that invokes presentation of synopsis information of a particular command. Command-line tool 112 can then display the synopsis information (e.g., the usage, a description, arguments, and/or other information related to the particular command) in the command-line interface. As another example, information about a command (e.g., a synopsis) may be presented in the command-line interface responsive to a user request for autocompleting the command.

Server system 130 can include one or more servers. In one implementation, server system 130 may be implemented on one or more machines, such as server computers, desktop computers, etc. In some implementations, server system 130 may be implemented on one or more machines separate from machines implementing each of client computers 110 and application platform 130, or may be implemented together with client computers 110 and application platform 130 on one or more machines, or some combination of the above.

Server system 130 can act as middleware between the client system and the application platform 110. In one implementation, a user, using the command line tool 112, can request the creation of a new application 124*a-n*, deployment of source code of application 124*a-n*, etc. In one embodiment, server system 130 manages the business logic and model representing the nodes 122*a-n* and the applications 124*a-n* residing on the nodes, and acts as a controller that generates the actions requested by users via an API of the command-line tool 112. The execution of the actions can then be orchestrated on nodes 122*a-n*.

As illustrated in FIG. 1, server system 130 can provide a command API 132 that may provide functionality for creating CLI commands (also referred to herein as the "commands"). A command can be created with one or more command options, command arguments, and/or any other components. In some embodiments, a command option and an argument can be a key-value pair. Command API 132 can provide one or more software libraries and one or more API specifications for developing commands. The API specifications may include formalized definitions of API resources, API methods, and/or API parameters. An API resource definition may include an API resource identifier, an API resource type, relationship data (e.g., relationship to other API resources and API methods, including references to one or more methods that operate on the resource), etc. An API method definition may include an API method identifier, relationship data (including references to the API resource and), API parameter definitions, etc. An API method may be a sequence of program instructions that perform a particular function. An API parameter definition may include an API parameter, relationship data (e.g., relationship with an API method), and etc. An API parameter may be a value of the function defined by an API method.

In some embodiments, a user of client computer 110 can issue a command using command-line tool 112 (e.g., a command to display a user list). Client computer 110 can generate a request that identifies an API method corresponding to the command and provides one or more values for one or more of the API parameters as defined by the API specification of command API 132. Client computer 110 can then transmit the request to server 130. In response to receiving the request, command API 132 may execute the API method using the values for one or more API parameters and may transmit a response to client computer 110. For example, an API method "list" may be used to return a user list. The available API parameters of the API method "list" may be time, location, and type. The client computer 110 may identify the "list" API method, using a respective command, and provide a value of "location=USA" for the location API parameter and transmit an identifier of the "list" API method and the "location=USA" value for the location API parameter to the server system 130. The server system 130 may then execute the "list" API method using the value of the location API parameter. The server system 130 may then return to the client system 130 response data comprising a list of users who are associated with the location of the USA.

Command API 132 can provide API specifications that enable a software developer to annotate one or more objects, classes, and/or fields of software code to mark them as corresponding to a command or a command option. For example, the software developer can provide one or more annotations defining attributes of the command or command option in association with classes and/or objects defining behaviors of the command. Each of the annotations may include syntactic metadata related to the command and/or the command options. Each of the annotations may include an at-sign ("@") followed by an annotation type and an option list of value pairs. The annotation type may be a command annotation, a particular option type, etc. For example, the software developer can define a command annotation specifying one or more attributes of the command, such as a name and/or description of the command, a "validator" attribute, an "activator" attribute, etc. The "validator" attribute may correspond to a logic that can verify a combination of values before executing the command. The "activator" attribute may indicate that execution of the command references to a standalone server or a managed domain. In a more particular example, a command annotation "CommandDefinition" may be provided in association with a class defining an "exit" command that may be executed to exit a program.

```
@CommandDefinition(name="exit", description = "exit the
program")
public static class ExitCommand implements Command {
    @Override
    public CommandResult execute(CommandInvocation invocation)
    throws IOException, InterruptedException {
        invocation.stop( );
        return CommandResult.SUCCESS;
    }
}
```

As another example, the software developer can define an option annotation that specifies one or more attributes of a command option, such as a type of the command option, a name of the command option, a description of the command option, whether the command is required or optional for the execution of the command, a default value, an "activator" attribute, etc. The "activator" attribute may correspond to a logic that may trigger the visibility of the command option. For example, the "activator" attribute may specify that the command option may be used when a value of another command option is set (e.g., when another command option is present in the CLI). As another example, the "activator" attribute may provide that the command option can be used when one or more other command options are not present. A type of the option may be, for example, a first option type that defines an option having one value, a second option type that defines an option having multiple values, a third option type that defines an option requiring one or more arguments, etc. In a more particular example as shown below, an option annotation "@ Option(hasvalue=false) private boolean myoption" may be used to define a command option for the command. The values of the option annotation correspond to attributes of the command option. For example, the string "option" in the option annotation indicates an option type. As another example, the value of "hasvalue" specifies if the command option accepts values.

```
@CommandDefinition(name = "mycommand", description = "Do some
stuff")
public class MyCommand implements <CliCommandInvocation> {
    @Option(hasvalue = false)
    private boolean myoption;
    @Override
    public CommandResult execute(CliCommandInvocation
    commandInvocation) {
        if (myoption) {
            ModelControllerClient client =
commandInvocation.getCommandContext( ).getModelControllerClient( );
            // Access to server, implement command logic
            // ...
        }
    }
}
```

Server system 130 can also include a synopsis generator 134 that can generate synopsis data for one or more commands. Synopsis generator 134 can generate synopsis data for a command responsive to a user request for information related to the command. For example, synopsis generator 134 can generate the synopsis data responsive to a user request for the synopsis data. In one implementation, the user request may correspond to a request for information about a particular command by issuing a command that invokes presentation of the information about the particular command. As another example, synopsis generator 134 can generate the synopsis data responsive to a request to test an implementation of the command submitted by a software developer.

Synopsis generator 134 can process data about implementations of one or more commands to generate the synopsis data. In some embodiments, the synopsis data may be generated by performing one or more operations described in connection with FIGS. 3-7 below. For example, upon receiving source code of an implementation of a command, synopsis generator 134 can process the software code and determine one or more command options related to the command and attributes of the command options. For example, the synopsis generator can analyze software code including an implementation of the command by performing introspection and/or reflection on the source code. The synopsis generator can analyze one or more annotated objects, classes, and/or fields (e.g., JAVA™ objects, classes, fields, etc.) in the software code that implements the command. The "introspection" may include a process of inspecting and/or examining source code (e.g., JAVA™ application code) to determine properties of software objects in the source code (e.g., JAVA™ objects). The "reflection" may include a process of inspecting, examining, and/or modifying runtime behavior of an application running in a virtual machine, such as one or more classes, interfaces, and/or software objects (e.g., JAVA™ objects) in the virtual machine (e.g., a JAVA™ virtual machine).

In some embodiments, the synopsis generator can perform introspection on classes defining the command and annotations associated with the classes. The annotations may correspond to the command and/or one or more command options. For example, synopsis generator 134 can introspect contents of one or more fields of a command option corresponding to an "activator" attribute. The contents of the "activator" attribute may indicate that execution of the command refers to a standalone server or a managed domain. Synopsis generator 134 can also introspect contents of one or more fields of the command option to determine the name of the command and any other attribute of the command provided in the command option. As another example, synopsis generator 134 can determine attributes of the command (e.g., a name, a description, etc.) by introspecting contents of a command option associated with the classes. In some embodiments, the synopsis generator can identify one or more of the annotations as including an option type. Synopsis generator 134 can then determine each of the identified annotations as an option annotation corresponding to a command option related to the command. Synopsis generator 134 can also introspect the contents of the option annotations to determine attributes of each of the identified command options. For example, synopsis generator 134 can introspect contents of one or more fields of an option annotation that indicate an option type, such as a first option type that defines an option having one value, a second option type that defines an option having multiple values, a third option type that defines an option requiring one or more arguments, etc. As another example, synopsis generator 134 can introspect contents of one or more fields of the option annotation that include a name of the command option, a description of the command option, whether the command is required or optional for the execution of the command, etc. As still another example, synopsis generator 134 can introspect contents of one or more fields of the option annotation that correspond to an "activator attribute." The contents of the "activator" attribute may indicate, for example, that the command option depends on another command option, that the command option conflicts with another command option, that the command option refers to a standalone server, and/or that the command option refers to a domain controller.

Synopsis generator 134 can also analyze relationships between the command options and determine dependencies of each of the command options in view of the annotations. For example, synopsis generator 134 can determine, for each of the command options, one or more other options that depend on the option, one or more other options on which the option depends, one or more other options that conflict with the option, etc. Synopsis generator 134 can also determine one or more constraints for each of the command options. For example, synopsis generator 134 can determine one or more execution contexts related to execution of the command option, such as whether the execution of the command option is attached to a fault-tolerant server. As another example, synopsis generator 134 can determine whether the execution of the command option requires connection to a specific running server instance or managed domain.

Synopsis generator 134 can generate relationship data in view of the analysis. The relationship data may include, for example, a graph representing dependencies of each of the command options. Synopsis generator 134 can generate a synopsis of the command in view of the relationship data. The synopsis can include information about one or more of the command options that relate to execution of the command (e.g., one or more options that make the command valid), such as syntaxes of the command options. In some embodiments, synopsis generator 134 can include one or more components described in connection with FIG. 2. The synopsis can be displayed in a command-line interface.

The synopsis can include one or more elements (also referred to as the "synopsis elements"). Each of the synopsis elements may include one or more characters (e.g., brackets, ellipses, backslashes, letters, numbers, etc.). The synopsis may include one or more synopsis elements containing a name of the command, a name of a command option associated with the command. One or more of the synopsis elements may contain one or more characters representing an attribute of the command option, such as whether the command option is required or optional (e.g., a bracket), an argument of the command option, a data type related to the command option, etc. One or more of the synopsis elements may contain one or more characters indicating a relationship between command options. For example, one or more of the synopsis elements may indicate a conflict between two options (e.g., "|").

An example of the synopsis is shown below:
command1 [--option1=<Boolean>] (--opt2=<string>|--opt3).

As illustrated, the synopsis may include a synopsis element (e.g., "command1") specifying a name of the command. The synopsis also include one or more synopsis elements specifying a syntax of a first command option (e.g., "option1"), such as an element specifying a name or description of the first command option (e.g., "--option1"), a data type of the first command option (e.g., "<Boolean>"), whether the first command option is required for the execution of the command (e.g., brackets "[ ]"), etc. The synopsis also include one or more synopsis elements specifying a syntax of a second command option (e.g., "(--opt2=<string>"). The synopsis also include one or more synopsis elements corresponding to a third command option that conflicts with the second command option, such as one or more elements indicating the conflict (e.g., parentheses "( )," a vertical bar "|"), one or more elements corresponding to the third command option (e.g., "(--opt3"), etc.

Figure 2:
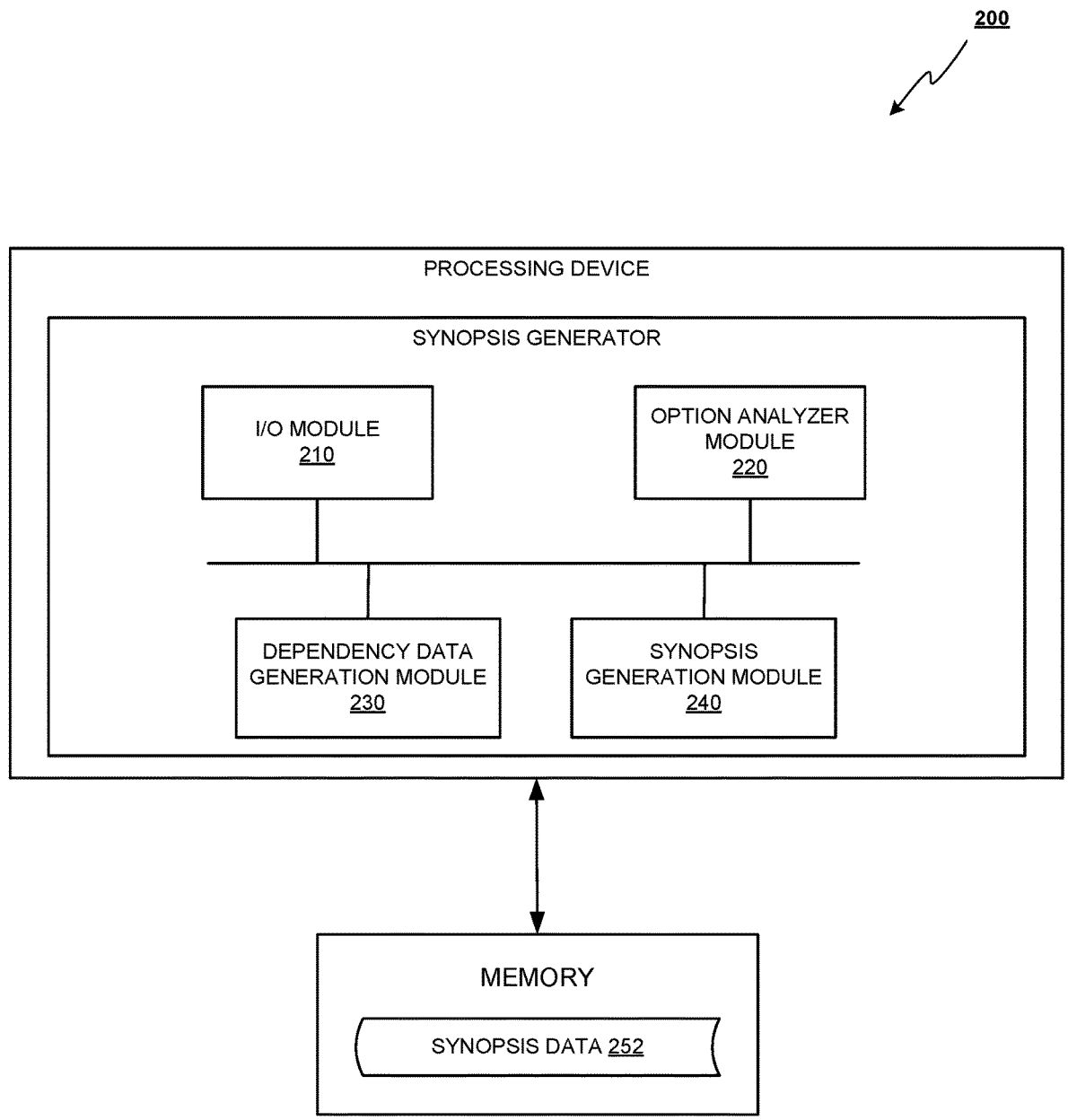
FIG. 2 depicts a block diagram illustrating an example of a computer system in accordance with an implementation of the disclosure.

FIG. 2 depicts a block diagram illustrating an example 200 of a computer system in accordance with one or more aspects of the disclosure. The computer system of FIG. 2 may be same as or similar to the server system 130 of FIG. 1 and may include one or more processing devices. As illustrated, the processing devices(s) can execute a synopsis generator (e.g., synopsis generator 134 of FIG. 1). The synopsis generator can include an input/output (I/O) module 210, an option analyzer module 220, a relationship data generation module 230, and a synopsis generator module 240. Computer system 200 can also include one or more memory devices storing synopsis data 252 and/or any other data in accordance with the present disclosure.

I/O module 210 can enable the processing device to receive and output data for automatic synopsis generation. For example, I/O module 210 can receive input data related to implementations of one or more commands. The input data may include source code including an implementation of a command. The software code may be provided in any suitable programming language, such as JAVA™ or any other object-oriented programming language. The software code may include one or more classes (e.g., JAVA™ classes) defining the command and one or more annotations associated with the classes. The annotations may include one or more command annotations and/or option annotations as described above.

In some embodiments, the input data may include one or more classes and/or fields including data about the command, such as a name of the command, a description of the command, etc. The input data can also include one or more classes and/or fields including data about one or more options related to the command. For example, one or more of the classes and/or fields may be associated with annotations including data about one or more attributes of command options related to the command. An attribute of an option may be, for example, a name of the option, a description of the option, a type of the option, an argument related to the option, whether the option is required for execution of the command, one or more attributes of the option, etc. A type of the option may be, for example, a first option of type that has one value, a second type of option that has multiple values, a third type of option that requires one or more arguments, etc. The attributes of the option may include, for example, a "completer" attribute, a "validator" attribute, etc. The "completer" attribute may relate to a completer logic that can be executed for automatic completion of one or more portions of the command. The "validator" attribute can relate to a validator logic that may be executed before the execution of the command to ensure that a value provided by a user for the execution of the command is valid.

In some embodiments, the input data may also include data about one or more constraints related to execution of a command. For example, one or more fields of the software code may indicate an execution context of the command, such as whether execution of the command and/or a command option related to the command is attached to a fault-tolerant server. As another example, one or more fields of the software code may indicate whether execution of the command and/or a command option related to the command requires connection to a server.

Option analyzer module 220 can process the input data and analyze command options related to one or more commands. For example, option analyzer module 220 can process the input data by performing introspection and/or reflection on the input data. The introspection and/or reflection can be performed by constructing new instances of classes, accessing the fields of objects or classes, invoking methods on objects or classes, and/or performing one or more other operations to inspect classes, interfaces, fields, methods, etc. at runtime. In some embodiments, option analyzer module 220 can create one or more objects that inspects information about one or more classes defining a command, such as contents of command annotation (e.g., "@ commanddefinition") and/or option annotations (e.g., "@ option") associated with the classes. In some embodiments, the reflection can be implemented using the JAVA™ Reflection API.

In some embodiments, the introspection and/or reflection may be performed to determine the content of the annotations of the options in the input data. Option analyzer module 220 can determine one or more command options related to a command and one or more attributes of each of the command options in view of the processing and the determine annotations. For example, option analyzer module 220 can identify one or more option annotations that including an option type (e.g., "option," "option list," etc.) as option annotations. Option analyzer module 220 can then determine each of the option annotations as corresponding to a command option. Option analyzer module 220 can also determine attributes of the command options based on the contents of the option annotations in view of the inspection. For example, the attribute of the command option may include a name of the command option, a description of the command option, whether the command is required or optional for the execution of the command, an "activator" attribute, etc.

Option analyzer module 220 can also determine relationships of the identified command options. For example, option analyzer module 220 can analyze an "activator" attribute of an option annotation of a first option to determine whether the visibility of the first option depends on another option. In response to determining that the "activator" attribute of the option annotation specifies that the first option can be used when a second option is presented in a CLI, option analyzer module 220 can determine that the first option depends on the second option. As another example, option analyzer module 220 can analyze the "activator" attribute of the option annotation of the first option to determine whether the first command option conflicts with another command option. As still another example, option analyzer module 220 can analyze the "activator" attribute of the option annotation to determine whether the command option refers to a standalone server or a managed domain. In response to determining that the "activator" attribute specifies that the first command option can be used when a third command option is not present in the CLI, option analyzer module 220 can determine that the first command option conflicts with the third command option. In some embodiments, option analyzer module 220 can determine, for each of the identified command options related to the command, one or more other options that depend on the option, one or more other options on which the option depends, and/or one or more other options that conflict with the option. Option analyzer module 220 can further determine a given option's validity in one or more execution contexts. In some embodiments, a given option can be valid (e.g., usable) in a particular execution context but invalid in another execution context.

Relationship data generation module 230 can generate relationship data for one or more commands in view of the relationships of the command options determined by option analyzer module 220. For example, relationship data generation module 230 can determine, for a given command, a list of one or more other command options that depend on the command option, a list of one or more other command options on which the command option depends on, a list of one or more other command options that conflict with the command option, etc.

As another example, relationship data generation module 230 can generate a graph representing relationships of multiple command options related to a command. The graph may include one or more nodes and arcs. Each of the nodes may correspond to a command option related to the command. For example, a first node and a second node of the graph may represent a first command option and a second command option, respectively. Each of the arcs may represent a relationship between two or more command options. For example, an arc associating the first node with the second node of the graph may indicate a relationship between the first command option and the second command option, such as that a relationship the first command option depends on the second command option, a relationship that the second commend option depends on the first command option, a relationship that the first command option conflicts with the second command option.

In some embodiments, relationship data generation module 230 can generate the graph by performing one or more operations described in connection with FIG. 4 below. For example, relationship data generation module 230 can designate the command options identified by options analyzer module 220 as candidate command options to be processed. Relationship data generation module 230 can create a first node of the graph corresponding to a first option of the candidate command options. Relationship data generation module 230 can identify one or more of the candidate command options that the first option depends on and generate nodes and/or arcs of the graph accordingly. For example, relationship data generation module 230 can determine a second option on which the first option depends and can generate a node of the graph corresponding to the second option. Relationship data generation module 230 can also generate a first arc associating the first node of the second node. As such, the first arc indicates that the first option depends on the second option. Relationship data generation module 230 can also determine a third option of the candidate command options that conflicts with the first option and generate a third node of the graph corresponding to the third option. Relationship data generation module 230 can then generate a second arc associating with the first node and the third node. As such, the second arc indicates the conflict between the first option and the third option.

Synopsis generation module 240 can generate synopsis data for a command. For example, synopsis generation module 240 can generate a synopsis for the command in view of relationship data and/or execution contexts related to the command. More particularly, for example, synopsis generation module 240 can identify one or more command options that make the command valid in view of the relationship data. The synopsis can include syntaxes of one or more command options related to the command. In some embodiments, synopsis generation module 240 can generate the synopsis data by performing one or more operations described in connection with FIGS. 5-7. In some embodiments, synopsis data can be generated for each of a plurality of execution contexts that may relate to the execution of the command (e.g., by executing processes 500-700 of FIGS. 5-7 for each of the execution contexts).

Figure 3:
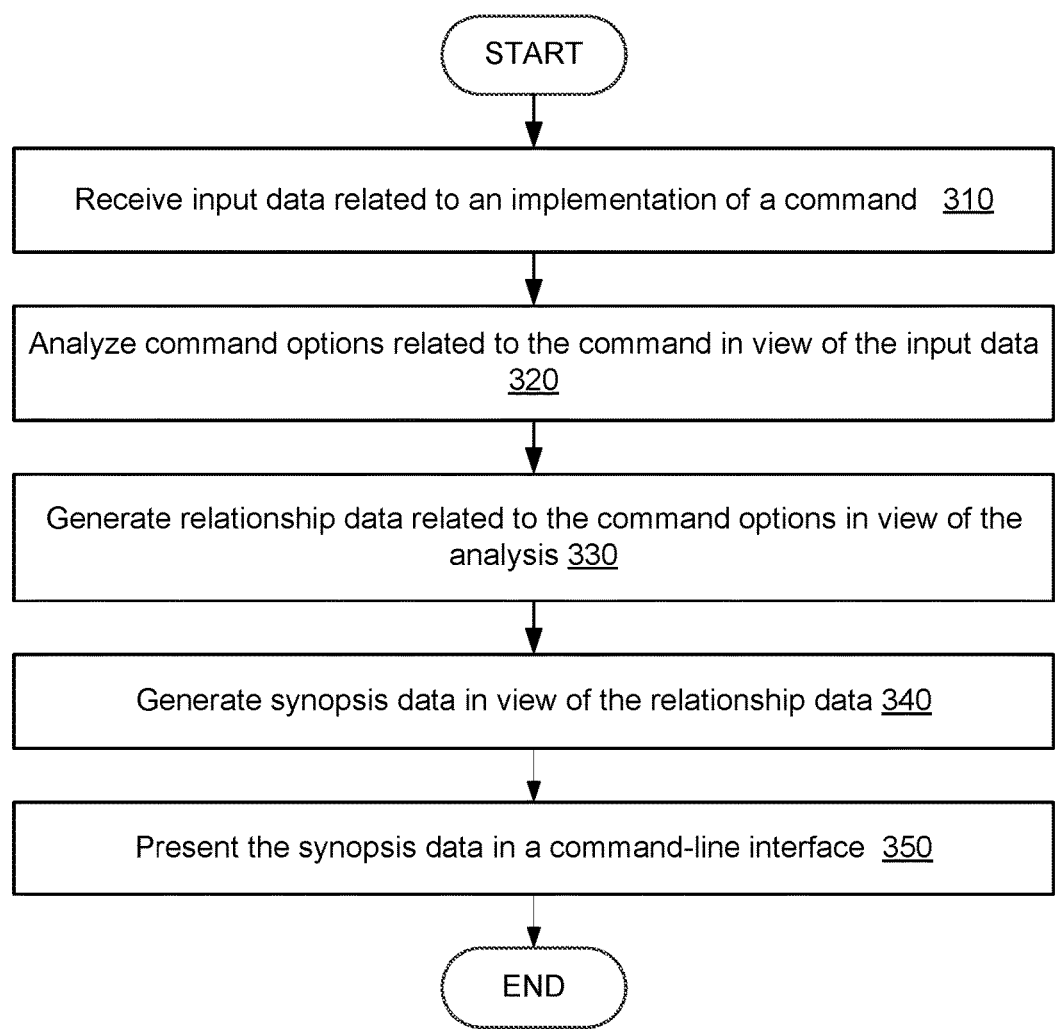
FIG. 3 is a flow diagram illustrating a method for automated synopsis generation according to an implementation of the disclosure.

FIG. 3 is a flow diagram illustrating a method 300 for automated synopsis generation according to an implementation of the disclosure. Method 300 can be performed by processing logic that may comprise hardware (e.g., circuitry, dedicated logic, programmable logic, microcode, etc.), software (such as instructions run on a processing device), firmware, or a combination thereof. In one implementation, method 300 is performed by a processing device (e.g. a processing device 802 of FIG. 8) of a server system as described in connection with FIGS. 1 and 2.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or memory page media.

Referring to FIG. 3, method 300 may begin at block 310 where the processing device receives input data related to an implementation of a command. The input data may include software code of the implementation of the command (e.g., annotated classes and/or fields including data about the command). The input data can also include one or more execution contexts relate to the implementation of the command.

At block 320, the processing device can analyze command options related to the command in view of the input data. For example, the processing device can perform introspection and/or reflection on the input data to determine the content of one or more annotations, classes, and/or fields of the software code corresponding to one or more command options of the command. In some embodiments, the processing device can identify one or more command options related to the command. The processing device can also determine one or more attributes of each of the command options, such as a name of a given command option, a type of the command option, etc.

In some embodiments, the processing device can analyze relationships between each of the command options with other command options. More particularly, for example, for a given command option of the command options, the processing device can determine one or more other command options that depend on the command option, one or more command options on which the command option depends, one or more command options that conflict with the command option, etc.

At block 330, the processing device can generate relationship data in view of the analysis. The relationship data can include any data structure that can represent relationships between two or more command options. For example, the relationship data can include one or more lists of other command options that related to a first command option. The lists may include, for example, a first list of one or more command options that depend on the first command option, a second list of one or more command options on which the first command option depends, a third list of one or more command options that conflict with the first command option, etc.

As another example, the relationship data can include a graph representing relationships a command option with one or more other command options. In some embodiments, the graph may include one or more nodes. Each of the nodes may correspond to a command option identified at block 330. The graph may also include one or more arcs. Each of the arcs may represent a relationship between two or more nodes of the graph. For example, an arc relating to a first node and a second node of the graph may represent a relationship between a first command option corresponding to the first node and a second command option corresponding to the second node (e.g., the first command option depending on the second command option, the second command option being depended on by the first command option, the first command option conflicting with the second command option, etc.).

In some embodiments, the relationship data may include data and/or information related to command options that relate to each of the command options. In some embodiments, the relationship data may be generated by performing one or more operations described in connection with FIG. 4.

At block 340, the processing device can generate synopsis data in view of the relationship data. The synopsis data can be generated in view of one or more execution contexts. Examples of execution contexts may include fault tolerant v. non-fault tolerant The synopsis data can include one or more synopses for the command. In some embodiments, the processing device can generate a synopsis for each of the execution contexts. Each of the synopses can include information about the command and/or one or more command options related to the command. For example, a synopsis of the command can include a name of the command and/or a description of the command. As another example, the synopsis can include syntaxes of one or more options that relate to the execution of the command, such as one or more options that are required to execute the command (also referred as the "required options"), one or more options that conflict with the required options, etc. The synopsis can include a description and/or name of each of the options, a syntax of each of the options, one or more arguments of each of the options, and/or any other information related to usage of the options. In some embodiments, the synopsis data can be generated by performing one or more operations described in connection with FIG. 5 below.

At 350, the processing device can present the synopsis data. The synopsis data can be presented in any suitable for that is consumable by a user. For example, the synopsis data can be presented in software documentation (e.g., a manual page or man page). As another example, the synopsis data can be presented as text in a command-line interface. The synopsis data can be presented (e.g., displayed) using a command line tool.

Figure 4:
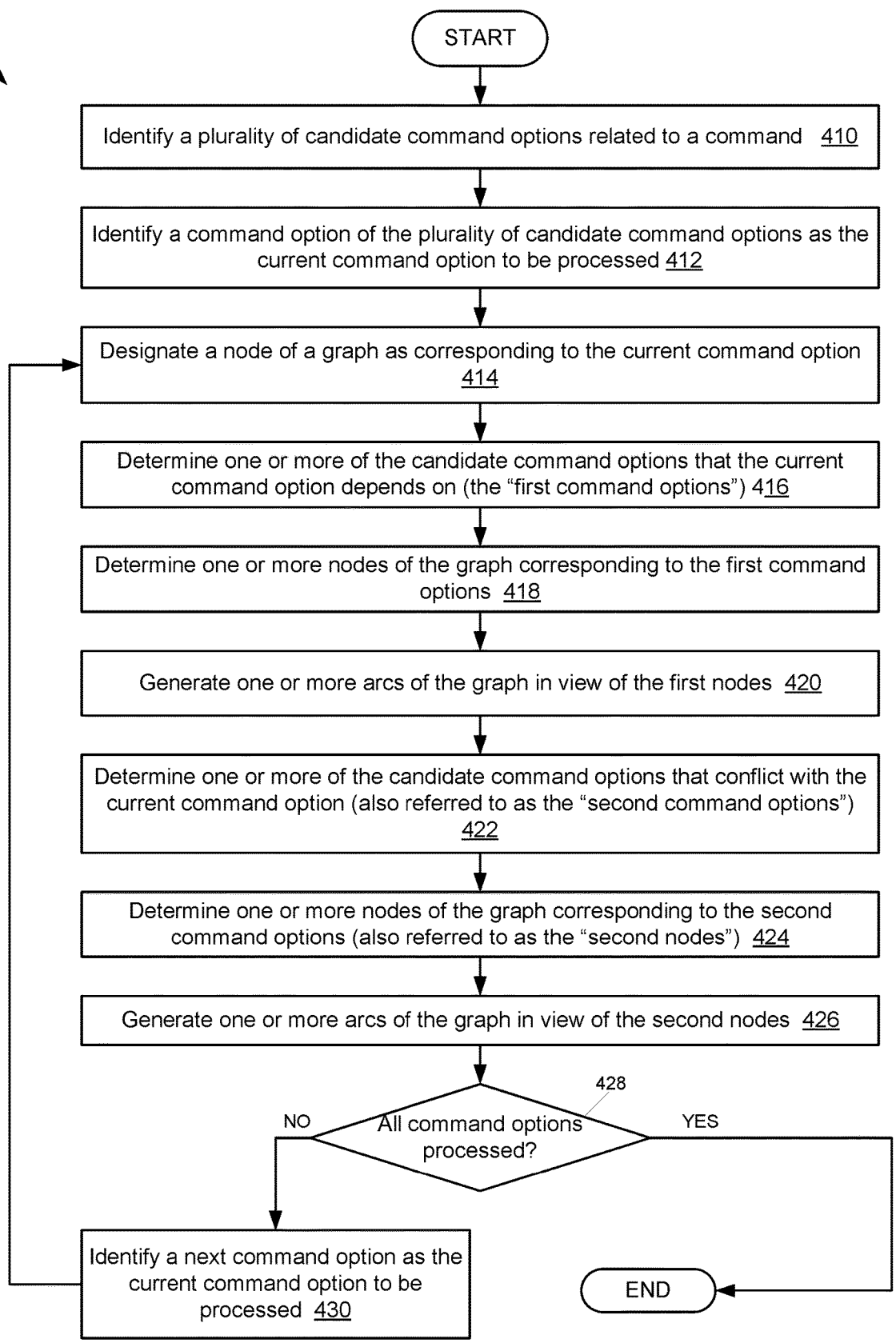
FIG. 4 is a flow diagram illustrating a method for generating relationship data for command options according to an implementation of the disclosure.

FIG. 4 is a flow diagram illustrating a method 400 for generating relationship data for command options according to an implementation of the disclosure. Method 400 can be performed by processing logic that may comprise hardware (e.g., circuitry, dedicated logic, programmable logic, microcode, etc.), software (such as instructions run on a processing device), firmware, or a combination thereof. In one implementation, method 400 is performed by a processing device (e.g. a processing device 802 of FIG. 8) of a server system as described in connection with FIGS. 1 and 2.

Method 400 begins at block 410 where the processing device identifies a plurality of candidate command options related to a command. For example, the processing device can perform introspection and/or reflection on software code containing an implementation of a command. The processing device can further determine one or more annotations in the software code corresponding to one or more command options. Each of the annotations may be associated with one or more objects, classes, and/or fields.

At block 412, the processing device can identify a command option of the plurality of candidate command options as the current command option to be processed. The current command option can be any command option of the candidate command options. In some embodiments, the current command option can be selected randomly from the candidate command options.

At block 414, the processing can designate a node of a graph as corresponding to the current command option. For example, the processing device can associate an existing node of the graph with the current command option. As another example, the processing device can create a new node of the graph and associate the new node with the current command option.

At block 416, the processing device can determine one or more of the candidate command options that the current command option depends on (also referred to as the "first command options").

At block 418, the processing device can determine one or more nodes of the graph corresponding to the first command options. For example, the processing device can identify an existing node of the graph that corresponds to one of the first command options. As another example, the processing device can determine that no existing node of the graph corresponds to a first command option and can create a node for one of the first command options.

At block 420, the processing device can generate one or more arcs of the graph in view of the first nodes. For example, the processing device can generate a first set of arcs of the graph, wherein each of the first set of arcs may represent association of the current command option with one of the first command options and may indicate that execution of the current command option may depend on execution of the first command option. As another example, the processing device can generate a second set of arcs of the graph in view of the first nodes. Each of the second set of arcs may represent association of the current command option with one of the first command options and may indicate that the first command option is depended on by the current command option.

At block 422, the processing device can determine one or more of the candidate command options that the current command option conflict with (also referred to as the "second command options").

At block 424, the processing device can determine one or more nodes of the graph that correspond to the second command options (also referred to as the "second nodes"). For example, the processing device can identify an existing node of the graph that corresponds to one of the second command options. As another example, the processing device can determine that no existing node of the graph corresponds to a second command option and can create a node for one of the second command options.

At block 426, the processing device can generate one or more arcs of the graph in view of the second nodes. For example, the processing device can determine a third set of arcs of the graph in view of the second nodes. Each of the third set of arcs may represent association of the current command option with one of the second nodes and may indicate that execution of the current command option conflicts with execution of the second command option.

As another example, the processing device can generate a fourth set of arcs of the graph in view of the second nodes. Each of the fourth set of arcs may represent association of the current command option with one of the second nodes and may indicate that execution of the current command option conflict with execution of the second command option.

At block 428, the processing device can determine whether all of the identified command options have been processed. In some embodiments, in response to determining that at least one of the command options is to be processed, the processing device can proceed to block 430. At 430, the processing device can identify a next command option as the current command option to be analyzed. The processing device can then loop back to 414.

Alternatively, the processing device can conclude process 400 in response to determining that all of the identified command options have been processed for generating synopsis data for the command.

Figure 5:
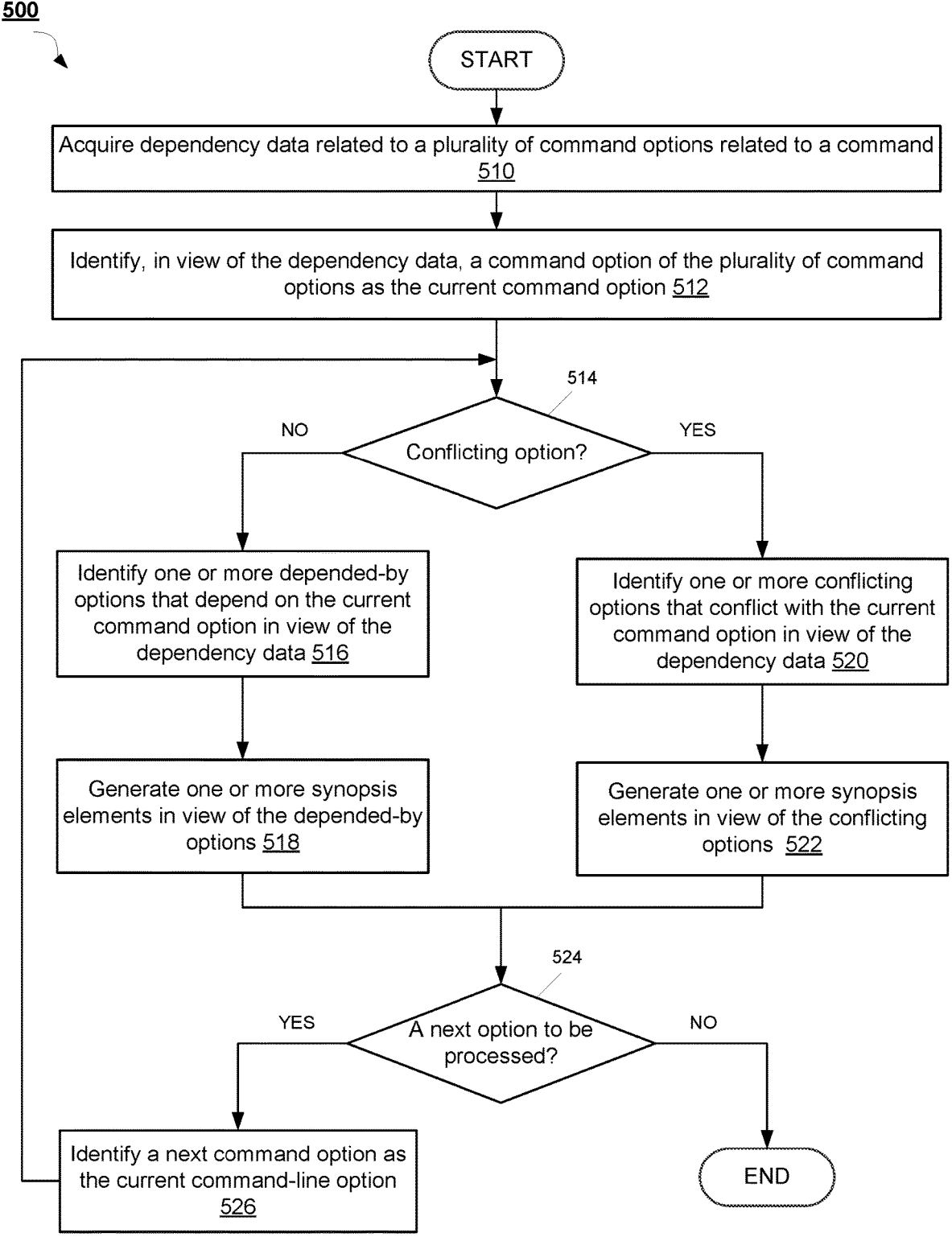
FIG. 5 is a flow diagram illustrating a method for generating synopsis data in view of dependency data according to an implementation of the disclosure.

FIG. 5 is a flow diagram illustrating a method 500 for generating synopsis data in view of dependency data according to an implementation of the disclosure. Method 500 can be performed by processing logic that may comprise hardware (e.g., circuitry, dedicated logic, programmable logic, microcode, etc.), software (such as instructions run on a processing device), firmware, or a combination thereof. In one implementation, method 500 is performed by a processing device (e.g. a processing device 802 of FIG. 8) of a server system as described in connection with FIGS. 1 and 2.

Method 500 begins at block 510 where the processing device acquires relationship data related to a plurality of command options. The relationship data may be acquired by performing one or more operations as described in connection with FIGS. 2-4 above.

At block 512, the processing device can identify a command option of the plurality of command options as the current command option to be processed. The identification can be made in view of the relationship data. For example, the processing device can identify a command option that does not depend on another command option in view of the dependency data as the current command option. In some embodiments, the processing device may identify multiple command options that do not depend on another command option. The processing device can select one of the multiple command options as the first command option. For example, the processing device can sort the command options in view of one or more criteria and select one of the sorted multiple command options as the first command option. The criteria may include, for example, whether a command option is required for execution of the command, the names of the command options (e.g., an alphabetic order), etc. As another example, the processing device can randomly select a command option of the multiple command options as the first command option.

At block 514, the processing device can determine whether the current command option conflicts with any other command option in view of the relationship data. For example, the processing device can determine whether an arc of the graph indicates that the current command option conflicts with another command option.

In response to determining that the current command option does not conflict with any other command option, the processing device can proceed to block 516 and can identify one or more command options that depend on the current command option (also referred to as the "depended-by options").

At block 518, the processing device can generate one or more synopsis elements in view of the depended-by options. For example, for each of the depended-by options, the processing device can generate one or more synopses that include a syntax of the first command option and relationships between the current command option and the depended-by option. In some embodiments, the processing device can generate the synopsis elements by performing one or more operations described in connection with FIG. 6 below.

In some embodiments, at block 514, the processing device can determine that the current command option conflicts with at least one other command option. In response to this determination, the processing device can proceed to block 520 and can identify one or more command options that conflict with the current command option (also referred to as the "conflicting options") in view of the dependency data. For example, the processing device can determine the conflicting options by identifying one or more arcs of the graph that indicate a conflict between the current command option and a conflicting option.

At block 522, the processing device can generate one or more synopsis elements in view of the conflicting options. The synopsis elements may include, for example, an indication that a conflicting option conflicts with the current command option (e.g., one or more symbols). The synopsis elements can also include syntaxes of the conflicting option(s) and/or one or more dependencies of the conflicting option(s) (e.g., a command option that depends on one or more of the conflicting options). In some embodiments, the synopsis elements can be generated by performing one or more operations as described in connection with FIG. 7 below.

At block 524, the processing device can determine whether each of the plurality of command options has been processed. In some embodiments, the processing device can proceed to block 528 in response to determining that at least one of the command options is to be processed to generate synopsis data for the command. At block 526, the processing device can identify a next command option of the plurality of command options as the current command option to be processed. The next command option can be any of the plurality of command options that has not been processed to generate synopsis data for the command. The processing device can then loop back to 516.

Alternatively, the processing device can conclude process 500 in response to determining that each of the plurality of command options has been processed to generate synopsis data for the command at 524.

Figure 6:
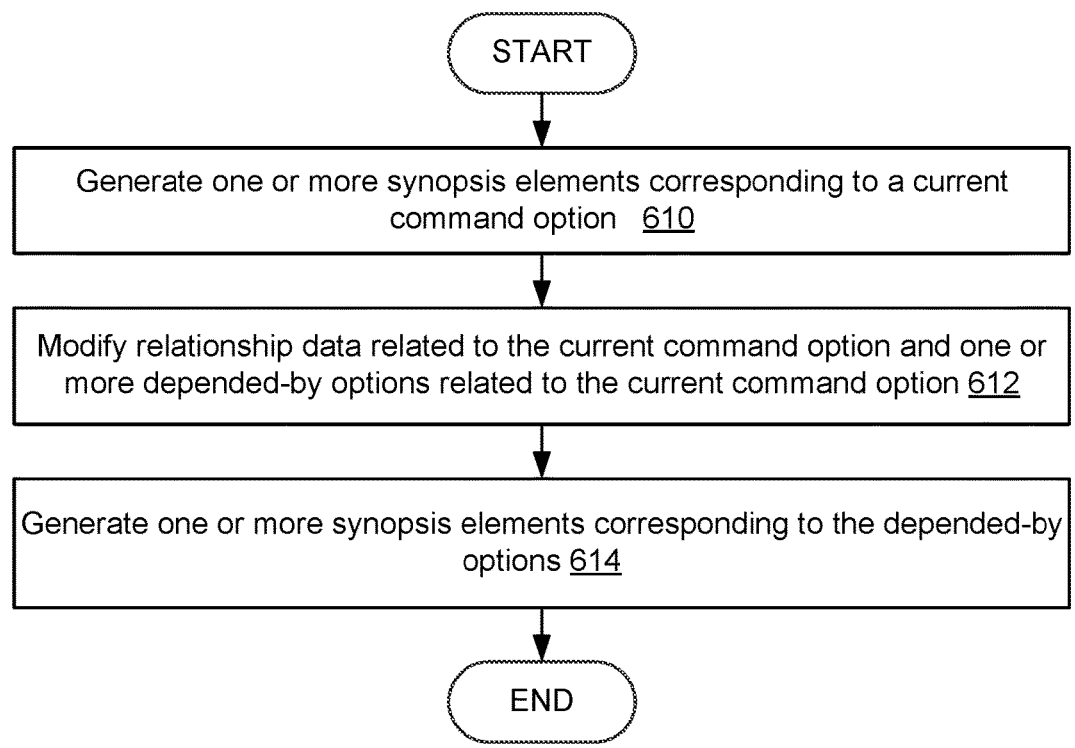
FIG. 6 is a flow diagram illustrating a method for generating synopsis data in view of dependencies of a command option according to an implementation of the disclosure.

FIG. 6 is a flow diagram illustrating a method 600 for generating synopsis data in view of dependencies of a command option according to an implementation of the disclosure. Method 600 can be performed by processing logic that may comprise hardware (e.g., circuitry, dedicated logic, programmable logic, microcode, etc.), software (such as instructions run on a processing device), firmware, or a combination thereof. In one implementation, method 600 is performed by a processing device (e.g. a processing device 802 of FIG. 8) of a server system as described in connection with FIGS. 1 and 2.

At block 610, the processing device can generate one or more synopsis elements corresponding to a current command option. Each of the synopsis elements can include one or more characters (e.g., brackets, ellipses, backslashes, text, etc.). Each of the synopsis elements can include data about one or more attributes of the current command option, such as a name of the current command option, a type of the current command option, one or more arguments of the current command option, whether the current command option is required for the implementation of the command, etc.

At block 612, the processing device can modify relationship data related to the current command option and one or more depended-by options related to the current command option. Each of the depended-by options can be a command option that depends on the current command option as described in connection with block 518 of FIG. 5. The processing device can modify the relationship data, for example, by removing the current command option from a list of command options that depend on each of the depended-by options. The processing device can also generate an indication that the current option has been processed for generation of synopsis data for the command.

At block 614, the processing device can generate one or more synopsis elements corresponding to the depended-by options. For example, the processing device can designate the depended-by options as the plurality of command options to be processed (e.g., the command options identified at block 510 of FIG. 5). The processing device can loop back to block 512 of FIG. 5 to process each of the depended-by options. More particularly, for example, each of the depended-by options can be processed by performing one or more operations described in connection with FIGS. 5-7.

Figure 7:
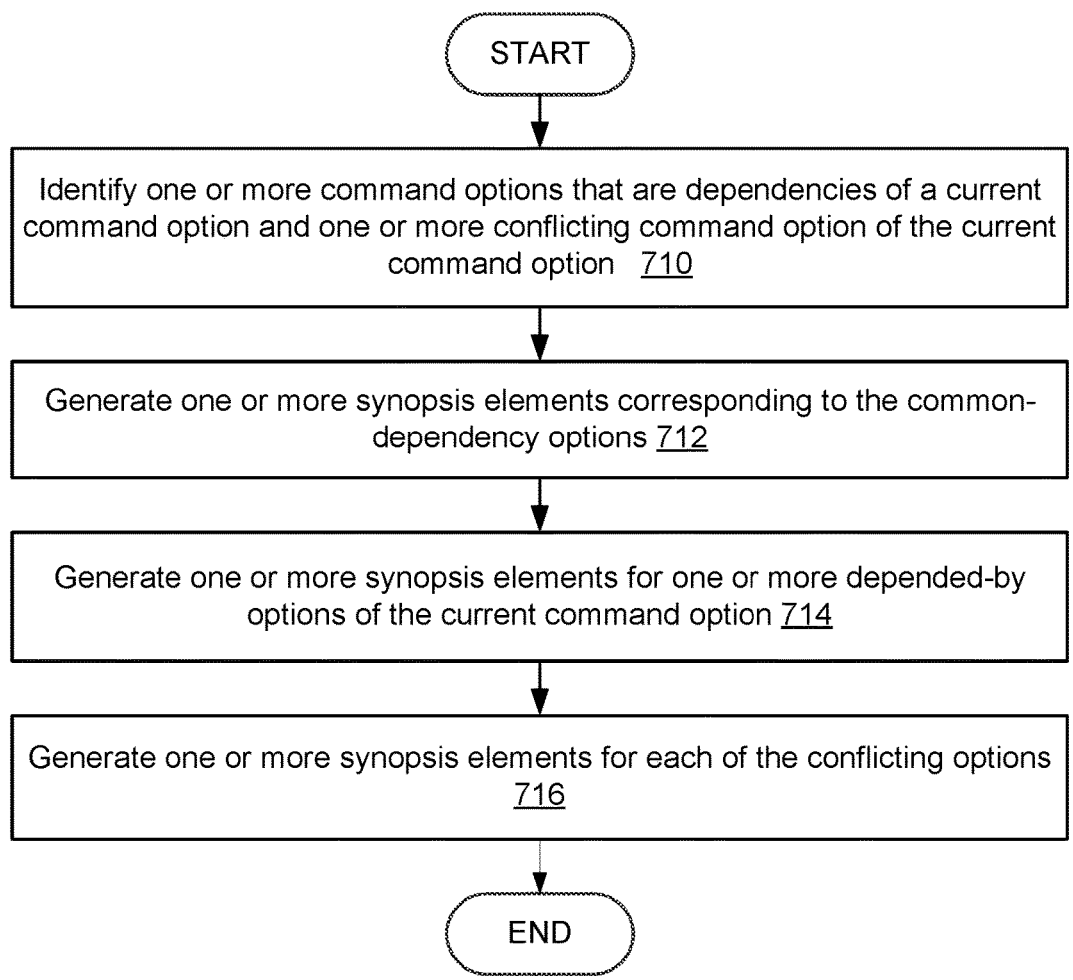
FIG. 7 is a flow diagram illustrating a method for generating synopsis data in view of conflicting options according to an implementation of the disclosure.

FIG. 7 is a flow diagram illustrating a method 700 for generating synopsis data in view of conflicting options according to an implementation of the disclosure. Method 700 can be performed by processing logic that may comprise hardware (e.g., circuitry, dedicated logic, programmable logic, microcode, etc.), software (such as instructions run on a processing device), firmware, or a combination thereof. In one implementation, method 700 is performed by a processing device (e.g. a processing device 802 of FIG. 8) of a server system as described in connection with FIGS. 1 and 2.

At block 710, the processing device can identify one or more command options that are dependencies of a current command option and one or more conflicting command option of the current command option. The identified command options are also referred to as the "common-dependency options." Each of the common dependency options may be a command option that depends on the current command option and a conflicting command option of the current command option.

At block 712, the processing device can generate one or more synopsis elements corresponding to the common-dependency options. For example, the processing device can designate the common-dependency options as the plurality of command options to be processed (e.g., the command options identified at block 510 of FIG. 5). The processing device can loop back to block 512 of FIG. 5 to process each of the common-dependency options. More particularly, for example, each of the common-dependency options can be processed by performing one or more operations described in connection with FIGS. 5-7.

At block 714, the processing device can identify one or more depended-by options of the current command option and can generate one or more synopsis elements in view of the depended-by options. For example, the synopsis elements can be generated by performing one or more operations as described in connection with FIG. 6.

At 716, the processing device can generate one or more synopsis elements for each of the conflicting options. For example, the processing device can generate a synopsis element indicating a conflict between a conflicting option and the current option. The synopsis element can include any suitable character (e.g., "|"). The processing device can identify one or more command options that depend on the conflicting option (also referred to herein as "conflicting-dependency options"). The processing device can create one or more synopsis elements in view of the conflicting-dependency options. For example, the processing device can suppress the conflict between the current command option and each of the conflicting-dependency options. The processing device can designate the conflicting-dependency options as the plurality of command options to be processed (e.g., the command options identified at block 510 of FIG. 5). The processing device can loop back to block 512 of FIG. 5 to process each of the conflicting-dependency options. More particularly, for example, each of the conflicting-dependency options can be processed by performing one or more operations described in connection with FIGS. 5-7.

Figure 8:
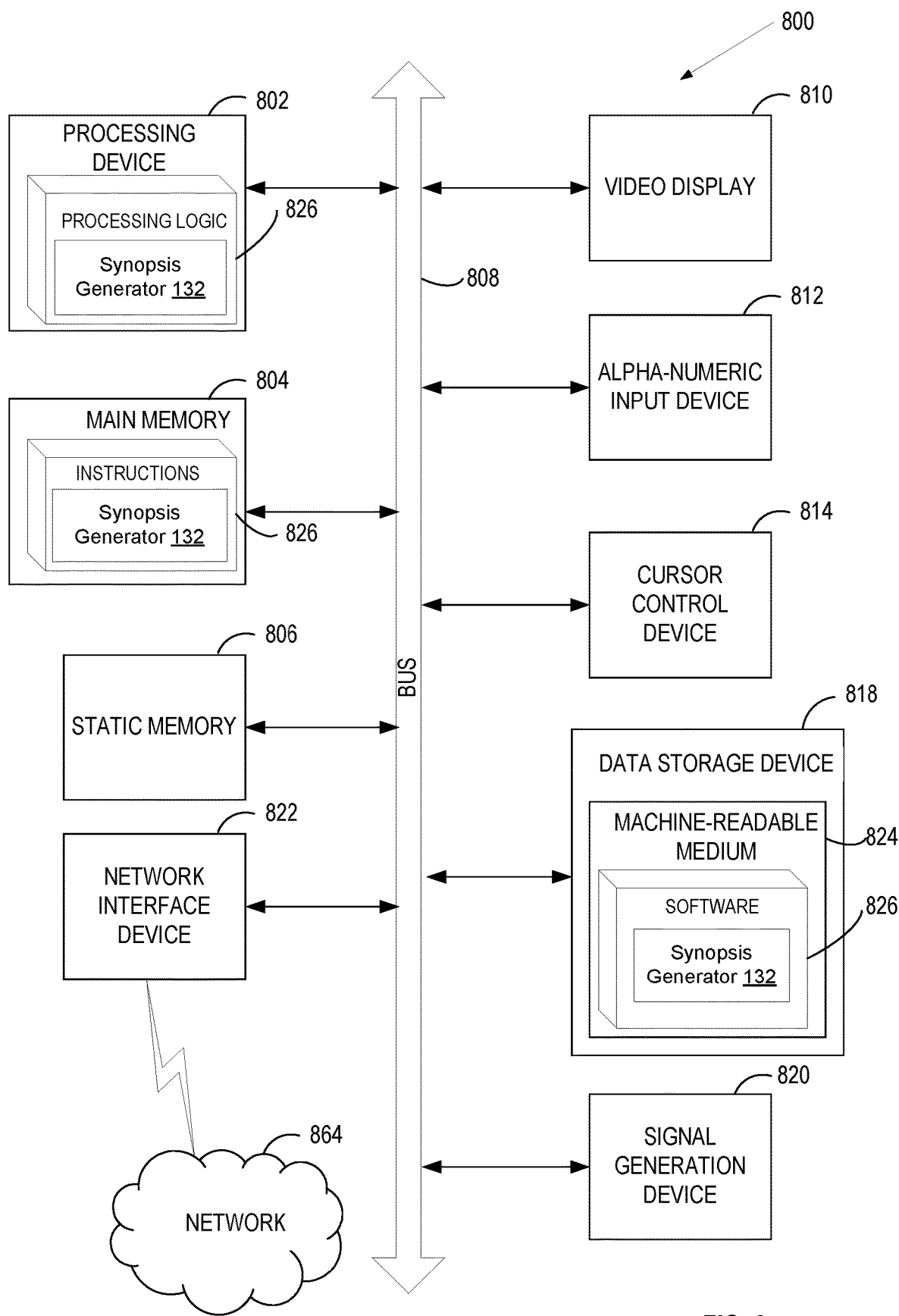
FIG. 8 illustrates a block diagram of an example of a computer device according to an implementation of the disclosure.

FIG. 8 illustrates a diagrammatic representation of a machine in the example form of a computer system 800 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 800 includes a processing device 802 (e.g., processor, CPU, etc.), a main memory 804 (e.g., read-only memory (ROM), flash memory, dynamic random access memory (DRAM) (such as synchronous DRAM (SDRAM) or Rambus DRAM (RDRAM), etc.), a static memory 806 (e.g., flash memory, static random access memory (SRAM), etc.), and a data storage device 818, which communicate with each other via a bus 808.

Processing device 802 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute the processing logic 426 for performing the operations and steps discussed herein.

The computer system 800 may further include a network interface device 822 communicably coupled to a network 864. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker).

The data storage device 818 may include a machine-accessible storage medium 824 on which is stored software 826 embodying any one or more of the methodologies of functions described herein. The software 826 may also reside, completely or at least partially, within the main memory 804 as instructions 826 and/or within the processing device 802 as processing logic 826 during execution thereof by the computer system 800; the main memory 804 and the processing device 802 also constituting machine-accessible storage media.

The machine-readable storage medium 824 may also be used to store instructions 826 to manage thread pools, such as the synopsis generator 132 as described with respect to FIGS. 1 and 2, and/or a software library containing methods that call the above applications. While the machine-accessible storage medium 824 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It will be apparent, however, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending," "receiving," "creating," "assigning," "providing," "executing," "storing," "managing," "identifying," "storing," "allocating," "determining," "associating," "generating," "designating", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The terms "first," "second," "third," "fourth," etc. as used herein are meant as labels to distinguish among different elements and may not necessarily have an ordinal meaning according to their numerical designation.

The disclosure also relates to an apparatus for performing the operations herein. This apparatus may be specially constructed for the purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the method steps. The structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Whereas many alterations and modifications of the disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the disclosure.

What is claimed is:

1. A method, comprising:
   processing source code implementing a command, wherein processing the source code comprises performing introspection on the source code;
   identifying, in view of the processing, a plurality of command options related to the command, wherein each of the plurality of command options comprises a corresponding parameter to modify execution of the command;
   generating, by a processing device, relationship data representing dependencies of the command options; and
   generating, by the processing device, synopsis data for the command in view of the relationship data, wherein generating the synopsis data comprises identifying, in view of the relationship data, a first command option of the plurality of command options, and generating a first synopsis element corresponding to the first command option.

2. The method of claim 1, wherein processing the source code further comprises identifying a plurality of annotations, and wherein each of the plurality of annotations references an attribute of a corresponding command option of the plurality of command options.

3. The method of claim 1, wherein generating the synopsis data further comprises:
   identifying, in view of the relationship data, a second command option that depends on the first command option; and generating a second synopsis element corresponding to the second command option.

4. The method of claim 3, wherein the relationship data comprises a graph, wherein the graph comprises an arc that associates a first node of the graph with a second node of the graph, wherein the first node corresponds to the first command option, and wherein the second node corresponds to the second command option.

5. The method of claim 3, wherein generating the synopsis data further comprises:
identifying, in view of the relationship data, a third command option that conflicts with the first command option; and
generating a third synopsis element corresponding to the third command option.

6. The method of claim 5, wherein generating the synopsis data further comprises:
identifying, in view of the relationship data, a fourth command option that depends on the first command option and the third command option; and
generating a fourth synopsis element corresponding to the fourth command option.

7. The method of claim 5, wherein generating the synopsis data further comprises:
determining, in view of the relationship data, that the third command option depends on a fifth command option; and
generating a fifth synopsis element corresponding to the fifth command option.

8. The method of claim 1, further comprising:
determining an execution context related to at least one of the plurality of command options, wherein the synopsis data is further generated in view of the execution context.

9. A system, comprising:
a memory; and
a processing device, communicably coupled to the memory, to:
process source code implementing a command, wherein to process the source code, the processing device is to perform introspection on the source code;
identify, in view of the processing, a plurality of command options related to the command, wherein each of the plurality of command options comprises a corresponding parameter to modify execution of the command;
generate relationship data representing dependencies of the plurality of command options; and
generate synopsis data for the command in view of the relationship data,wherein to generate the synopsis data, the processing device is to identify, in view of the relationship data, a first command option of the plurality of command options, and generate a first synopsis element corresponding to the first command option.

10. The system of claim 9, wherein, to process the source code, the processing device is further to identify a plurality of annotations, and wherein each of the plurality of annotations references an attribute of a corresponding command option of the plurality of command options.

11. The system of claim 9, wherein, to generate the synopsis data, the processing device is further to:
identify, in view of the relationship data, a second command option that depends on the first command option; and
generate a second synopsis element corresponding to the second command option.

12. The system of claim 11, wherein the relationship data comprises a graph, wherein the graph comprises an arc that associates a first node of the graph with a second node of the graph, and wherein the first node corresponds to the first command option and the second node corresponds to the second command option.

13. The system of claim 11, wherein, to generate the synopsis data, the processing device is further to:
identify, in view of the relationship data, a third command option that conflicts with the first command option; and
generate a third synopsis element corresponding to the third command option.

14. The system of claim 13, wherein, to generate the synopsis data, the processing device is further to:
identify, in view of the relationship data, a fourth command option that depends on the first command option and the third command option; and
generate a fourth synopsis element corresponding to the fourth command option.

15. The system of claim 13, wherein to generate the synopsis data, the processing device is further to:
identify, in view of the relationship data, that the third command option depends on a fifth command option; and
generate a fifth synopsis element corresponding to the fifth command option.

16. A non-transitory machine-readable storage medium including instructions that, when accessed by a processing device, cause the processing device to:
process source code implementing a command, wherein to process the source code, the processing device is to perform introspection on the source code;
identify, in view of the processing, a plurality of command options related to the command, wherein each of the plurality of command options comprises a corresponding parameter to modify execution of the command;
generate relationship data representing dependencies of the plurality of command options; and
generate synopsis data for the command in view of the relationship data, wherein to generate the synopsis data, the processing device is to identify, in view of the relationship data, a first command option of the plurality of command options, and generate a first synopsis element corresponding to the first command option.

17. The non-transitory machine-readable storage medium of claim 16, wherein to process the source code, the processing device is further to identify a plurality of annotations, and wherein each of the plurality of annotations references an attribute of a corresponding command option of the plurality of command options.

18. The non-transitory machine-readable storage medium of claim 16, wherein to generate the synopsis data, the processing device is further to :
identify, in view of the relationship data, a second command option that depends on the first command option; and
generate a second synopsis element corresponding to the second command option.

* * * * *